(12) United States Patent
Rusmisel et al.

(10) Patent No.: US 7,899,044 B2
(45) Date of Patent: Mar. 1, 2011

(54) METHOD AND SYSTEM FOR OPTIMIZING RESOURCES FOR ESTABLISHING PSEUDO-WIRES IN A MULTIPROTOCOL LABEL SWITCHING NETWORK

(75) Inventors: Jason Dirk Rusmisel, Ottawa (CA); Alexander Kutman, Kanata (CA); Bassem Abdel-Aziz, Kanata (CA); Carl Rajsic, Nepean (CA)

(73) Assignee: Alcatel Lucent, Paris (FR)

( * ) Notice: Subject to any disclaimer, the term of this patent is extended or adjusted under 35 U.S.C. 154(b) by 906 days.

(21) Appl. No.: 11/448,826

(22) Filed: Jun. 8, 2006

(65) Prior Publication Data

US 2007/0286090 A1    Dec. 13, 2007

(51) Int. Cl.
*H04L 12/28* (2006.01)
(52) U.S. Cl. ............... 370/389; 370/392; 370/400; 370/401; 370/395.53
(58) Field of Classification Search ............... 370/230, 370/252, 389, 395.53, 392, 401, 400
See application file for complete search history.

(56) References Cited

U.S. PATENT DOCUMENTS

| | | | | |
|---|---|---|---|---|
| 7,304,947 | B2* | 12/2007 | Skalecki et al. | 370/230 |
| 7,319,699 | B1* | 1/2008 | Provine et al. | 370/395.3 |
| 7,394,811 | B2* | 7/2008 | Gibson et al. | 370/392 |
| 7,394,820 | B1* | 7/2008 | Dianda | 370/401 |
| 7,417,950 | B2* | 8/2008 | Hofmeister et al. | 370/230 |
| 7,516,224 | B2* | 4/2009 | Guichard et al. | 709/227 |
| 7,756,126 | B2* | 7/2010 | Iyer et al. | 370/389 |
| 2005/0044262 | A1* | 2/2005 | Luo | 709/238 |
| 2005/0089047 | A1* | 4/2005 | Ould-Brahim et al. | 370/395.53 |
| 2005/0147104 | A1* | 7/2005 | Ould-Brahim | 370/395.5 |
| 2006/0034251 | A1* | 2/2006 | Sivabalan et al. | 370/351 |
| 2006/0062218 | A1* | 3/2006 | Sasagawa | 370/389 |
| 2006/0080421 | A1* | 4/2006 | Hu | 709/223 |
| 2007/0008982 | A1* | 1/2007 | Voit et al. | 370/401 |
| 2007/0217331 | A1* | 9/2007 | Khanna et al. | 370/224 |
| 2007/0217420 | A1* | 9/2007 | Raj et al. | 370/392 |

OTHER PUBLICATIONS

Martini et al.; "Pseudowire setup and Maintenance using LDP"; 2005 Network Working Group; pp. 1-42.*
Martini, et al., Pseudowire Setup and Maintenance Using the Label Distribution Protocol (LDP), Apr. 2006, pp. 1-29, Network Working Group.
B.Thomas, et al., LDP Applicability, Jan. 2001, pp. 1-7, Network Working Group.
Anderson, et al., LDP Specification, Jan. 2001, pp. 1-132, Network Working Group.

* cited by examiner

*Primary Examiner*—Ricky Ngo
*Assistant Examiner*—Dewanda Samuel
(74) *Attorney, Agent, or Firm*—Kramer & Amada, P.C.

(57) ABSTRACT

A method for establishing a pseudo-wire connection between first and second switches in a packet switched network, the method comprising: sending a label mapping message to the second switch requesting that the pseudo-wire connection be established with the first switch; reserving resources for the pseudo-wire connection at the first switch; receiving a label withdraw message from the second switch if the second switch has insufficient resources for the pseudo-wire connection and, in response to the label withdraw message, releasing the resources for the pseudo-wire connection at the first switch; and, activating the pseudo-wire connection if the second switch has sufficient resources for the pseudo-wire connection, thereby optimizing resources for establishing pseudo-wire connections of each of the first and second switches.

10 Claims, 3 Drawing Sheets

METHOD AND SYSTEM FOR OPTIMIZING RESOURCES FOR ESTABLISHING PSEUDO-WIRES IN A MULTIPROTOCOL LABEL SWITCHING NETWORK

FIELD OF THE INVENTION

This invention relates to the field of network management and service provisioning, and more specifically, to a method and system for optimizing resources for establishing pseudo-wires in a multiprotocol label switching network.

BACKGROUND OF THE INVENTION

Multiprotocol label switching ("MPLS") provides a mechanism for engineering network traffic patterns in which short labels are assigned to network packets that describe how to forward them through the network. In a MPLS network, a node, switch or router which supports MPLS is generally known as a label switching router ("LSR") and a LSR at the edge (ingress or egress) of the MPLS network is generally known as a label edge router ("LER").

In general, as a data frame of a connectionless network layer protocol (e.g., the Internet Protocol ("IP")) travels from a source node to a destination node it travels from one node to the next through the network. Each node makes an independent forwarding decision for that packet. That is, each node analyzes the data frame's header to determine where to forward the packet next. The forwarding decision is determined by a forwarding table that is present on each node and that is built by network layer routing algorithms running on that node. Therefore each router independently chooses a next hop for the data frame, based on its analysis of the packet's header and the results of running the routing algorithm.

Frame headers contain considerably more information than is needed simply to choose the next hop along the path. Choosing the next hop can therefore be thought of as the combination of two functions. The first function partitions the entire set of possible packets into a set of forwarding equivalence classes ("FECs"). In conventional IP forwarding the FEC is a subnet IP address prefix. Therefore a particular node will typically consider two packets to be in the same FEC if there is some address prefix "X" in that router's routing tables such that "X" is the "longest match" for each packet's destination address. The second maps each FEC to a next hop. Insofar as the forwarding decision is concerned, different packets which get mapped into the same FEC are indistinguishable. All data frames which belong to a particular FEC and which travel from a particular node will follow the same path (or if certain kinds of multi-path routing are in use, they will all follow one of a set of paths associated with the FEC). As the data frame traverses the network, each hop in turn re-examines the packet and matches it to a FEC in order to determine the next hop.

In MPLS, the assignment of a particular data frame to a particular FEC is done just once, as the data frame enters the network. The FEC to which the packet is assigned is encoded as a short fixed length value known as a "label". When a packet is forwarded to its next hop, the label is sent along with it; that is, the packets are "labelled" before they are forwarded. At subsequent hops, there is no further analysis of the data frame's network layer header. Rather, the label in the frame header is used as an index into a table on the node. The table entry specifies the next hop, and a new label. The old label in the frame header is replaced with the new label, and the data frame is forwarded to its next hop. Thus, in the MPLS forwarding paradigm, once a packet is assigned to a FEC, no further network layer header analysis is done by subsequent routers; all forwarding is driven by the labels.

For reference, the MPLS header is made up of a stack of 32 bit labels. The MPLS "label" is 20 bits long and is the identifier that is locally significant to the LSR. The "experimental bits" field is 3 bits long and is used to determine the quality of service ("QoS") that is to be applied to the data frame. The "stack" field takes one bit and is used to determine whether there is another label stack entry in the header. And, the time-to-live ("TTL") field is 8 bits long and is similar to the TTL field carried in the IP header and is used to determine how many hops the frame can traverse before it is dropped. The IP frame is encapsulated in with an MPLS header at the ingress edge of the MPLS network. At the egress edge, the IP frame is restored by removing the MPLS header.

The label distribution protocol ("LDP") is used to build and maintain MPLS label databases that are used to forward traffic through MPLS networks. The LDP is specified in IETF documents RFC 3036, "LDP Specification", January 2001, and RFC 3037, "LDP Applicability", January 2001, which are incorporated herein by reference. As mentioned above, MPLS is a method for forwarding packets that uses short, fixed-length values carried by packets, called labels, to determine packet next hops. A fundamental concept in MPLS is that two LSRs must agree on the meaning of the labels used to forward traffic between and through them. This common understanding is achieved by using a set of procedures (i.e., the LDP) by which one LSR informs another of label bindings it has made. Thus, the LDP is a set of procedures by which one LSR informs another of the meaning of labels used to forward traffic between and through them.

Now, a pseudo-wire (or pseudowire or "PW") is an emulation of a native service over a packet switched network ("PSN"). The native service may be asynchronous transfer mode ("ATM"), Frame Relay, Ethernet, low-rate time-division multiplexing ("TDM"), or synchronous optical network/synchronous digital hierarchy ("SONET/SDH"), while the PSN may be a MPLS, IP, or Layer 2 tunnelling protocol ("L2TP") based network. The PW emulates the operation of a "transparent wire" carrying the native service. In other words, a pseudo-wire emulates a point-to-point link, and provides a single service which is perceived by its user as an unshared link or circuit of the chosen service.

In general, a pseudo-wire ("PW") is a connection between two provider edge ("PE") devices which connects two attachment circuits ("ACs"). An AC can be a Frame Relay data link connection identifier ("DLCI"), an ATM virtual path identifier/virtual channel identifier ("VPI/VCI"), an Ethernet port, a virtual local area network ("VLAN"), a high-level data link control ("HDLC") link, a point-to-point protocol ("PPP") connection on a physical interface, a PPP session from an L2TP tunnel, an MPLS label switched path ("LSP"), etc. During the setup of a PW, the two PEs will be configured or will automatically exchange information about the service to be emulated so that later they know how to process packets coming from the other end. After a PW is set up between two PEs, frames received by one PE from an AC are encapsulated and sent over the PW to the remote PE, where native frames are re-constructed and forwarded over the other AC. The PE devices may be, for example, MPLS switches.

PW extensions to the LDP are described in Internet Engineering Task Force ("IETF") request for comment ("RFC") document RFC 4447, "Pseudowire Setup and Maintenance Using the Label Distribution Protocol (LDP)", April 2006, which is incorporated herein by reference. According to RFC 4447, Layer 2 services (such as Frame Relay, ATM, and Ethernet) can be "emulated" over an MPLS backbone by encapsulating the Layer 2 protocol data units ("PDUs") and transmitting them over PWs. In other words, PWs are created to carry different types of traffic across a MPLS network, the PW being a point-to-point network connection over MPLS that offers transparency of the Layer 2 service which it transports.

RFC 4447 specifies a protocol for establishing and maintaining PWs, using extensions to the LDP. It defines new type-length-values ("TLVs"), FEC elements, parameters, and codes for LDP, which enable LDP to identify PWs and to signal attributes of PWs. It specifies how a PW endpoint uses these TLVs in LDP to bind a demultiplexor field value (i.e., an MPLS label as described above) to a PW, and how it informs the remote endpoint of the binding. It also specifies procedures for reporting PW status changes, for passing additional information about the PW as needed, and for releasing the bindings.

Consider the following RFC 4447 scenario. Suppose that it is desired to transport Layer 2 PDUs from ingress LSR PE, to egress LSR $PE_2$, across an intervening MPLS-enabled network. Assume that there is an MPLS tunnel from $PE_1$ to $PE_2$. That is, assume that $PE_1$ can cause a packet to be delivered to $PE_2$ by encapsulating the packet in an "MPLS tunnel header" and sending the result to one of its adjacencies. The MPLS tunnel is a MPLS label switched path ("LSP"); thus, putting on an MPLS tunnel encapsulation is a matter of pushing on an MPLS label. Also suppose that a large number of PWs can be carried through a single MPLS tunnel. Thus, it is never necessary to maintain state in the network core for individual PWs. It is not presupposed that the MPLS tunnels are point to point; although the PWs are point to point, the MPLS tunnels may be multipoint to point. It is not presupposed that $PE_2$ will even be able to determine the MPLS tunnel through which a received packet was transmitted. (For example, if the MPLS tunnel is an LSP and penultimate hop popping is used, when the packet arrives at $PE_2$ it will contain no information identifying the tunnel.) When $PE_2$ receives a packet over a PW, it must be able to determine that the packet was in fact received over a PW, and it must be able to associate that packet with a particular PW. $PE_2$ is able to do this by examining the MPLS label that serves as the PW demultiplexor field. This label may by called the "PW label". When $PE_1$ sends a Layer 2 PDU to $PE_2$, it creates an MPLS packet by adding the PW label to the packet, thus creating the first entry of the label stack. If the PSN tunnel is an MPLS LSP, the $PE_1$ pushes another label (i.e., the tunnel label) onto the packet as the second entry of the label stack. The PW label is not visible again until the MPLS packet reaches $PE_2$. $PE_2$'s disposition of the packet is based on the PW label.

Thus, a PW is a point-to-point connection across an MPLS network identified by a stack of two labels. The first label is called the "outer" label. It represents the outer tunnel, or outer LSP. This outer tunnel is needed to transport the packets across the network. Within this outer tunnel, "inner" connections (i.e., PWs) may be multiplexed. Each of these inner connections is identified by a second label, usually called the "inner" label. The outer tunnel is usually signalled (i.e., labels exchanged, etc.) using a protocol such as LDP or the resource reservation protocol-traffic extension ("RSVP-TE"). The inner connection (i.e., the PW) is signalled using LDP in its downstream unsolicited ("DU") mode (i.e., "LDP-DU"). When LDP-DU mode is engaged, a LSR (e.g., a MPLS switch) can distribute MPLS label bindings to other LSRs that have not explicitly requested them. This label management behaviour is described in RFC 3036.

The MPLS LDP-DU signalling protocol with PW extensions is thus used to establish bidirectional PWs across a MPLS network. For PWs requiring resources, reservations are made independently in each direction. This is accomplished by an exchange of signalling messages between the MPLS switches that are the endpoints of the PW, which triggers the resource reservation. However, this signalling exchange may give rise to the situation where one MPLS switch is able to reserve resources for a PW while the other MPLS switch may fail to reserve resources. In this case, the signalling behaviour is such that the successfully reserved resources are held until the failed PW connection can be established, which may never occur. This can be problematic in that a PW that is unable to be established due to a failure to acquire resources in one direction, may maintain a lock on resources at the opposite end. This is inefficient in that if the locked resources were available, they may have been able to have been used to allow a different PW to be successfully established bi-directionally or to allow another type of connection (e.g., a LSP) competing for these resources to be established. Efficient allocation of such resources becomes most important upon re-establishing links after a network or network element failure or when contention for the same resources exists among different entities in a switch.

A need therefore exists for an improved method and system for optimizing resources for establishing PW connections in a MPLS network. Accordingly, a solution that addresses, at least in part, the above and other shortcomings is desired.

SUMMARY OF THE INVENTION

According to one aspect of the invention, there is provided a method for establishing a pseudo-wire connection between first and second switches in a packet switched network, the method comprising: sending a label mapping message to the second switch requesting that the pseudo-wire connection be established with the first switch; reserving resources for the pseudo-wire connection at the first switch; receiving a label withdraw message from the second switch if the second switch has insufficient resources for the pseudo-wire connection and, in response to the label withdraw message, releasing the resources for the pseudo-wire connection at the first switch; and, activating the pseudo-wire connection if the second switch has sufficient resources for the pseudo-wire connection, thereby optimizing resources for establishing pseudo-wire connections of each of the first and second switches.

In the above method, the network may be a multiprotocol label switching ("MPLS") network. The first and second switches may be first and second MPLS switches, respectively. The pseudo-wire connection may be a bi-directional pseudo-wire connection. The bi-directional pseudo-wire connection may be one or more bi-directional pseudo-wire connections. The method may further include configuring the pseudo-wire connection on each of the first and second switches. And, the resources may be one or more of memory, processor capacity, network interface capacity, connection admission control resources, allocated pseudo-wire labels, pseudo-wire label binding context, and pseudo-wire connection state maintenance.

In accordance with further aspects of the present invention there is provided an apparatus such as a data processing system (e.g., a MPLS switch, a network element, a network management system, etc.), a method for adapting this system, as well as articles of manufacture such as a computer readable medium having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

In the following description, details are set forth to provide an understanding of the invention. In some instances, certain software, circuits, structures and techniques have not been described or shown in detail in order not to obscure the invention. The term "data processing system" is used herein to refer to any machine for processing data, including the network elements and network management systems described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention. The present invention may also be implemented in hardware.

Figure 1:
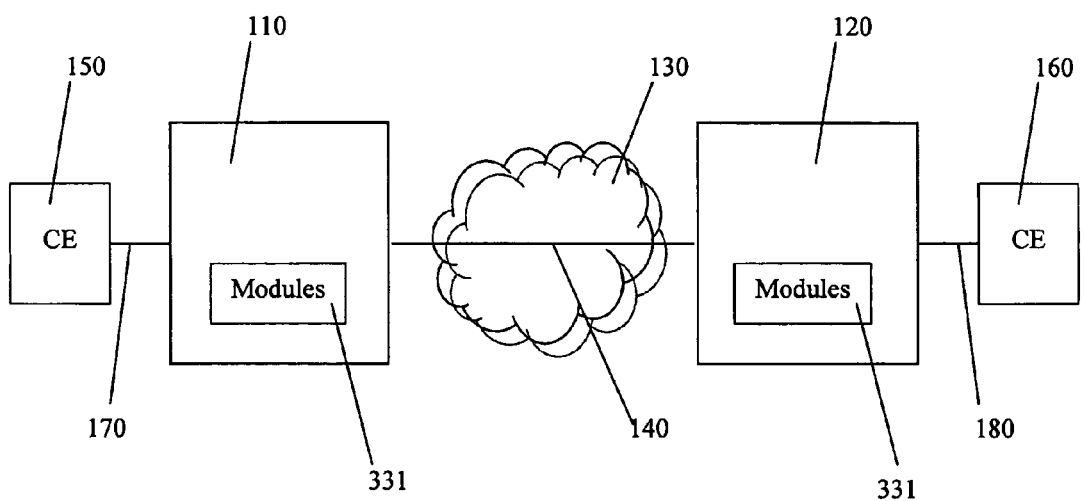
FIG. 1 is a block diagram illustrating a communications system for providing Layer 2 services to subscribers in accordance with an embodiment of the invention.

FIG. 1 is a block diagram illustrating a communications system 100 for providing Layer 2 services to subscribers in accordance with an embodiment of the invention. The communications system 100 includes a first MPLS switch 110 coupled to a second MPLS switch 120 over a PSN network 130 (e.g., an MPLS network) via a pseudo-wire ("PW") connection 140. Customer edge ("CE") devices 150, 160 are coupled to respective MPLS switches 110, 120 by respective attachment circuits ("ACs") 170, 180. The MPLS switches 110, 120 may be provider edge ("PE") devices, nodes, elements, switches, routers, etc. The MPLS switches 110, 120 are maintained by a service provider ("SP") to provide Layer 2 services to a subscriber or user via the CE devices 150, 160. According to one embodiment, the MPLS switches 110, 120 may be coupled to a network management system ("NMS") (not shown) for controlling and monitoring purposes. The NMS may be located at the SP's central office ("CO") or elsewhere.

Figure 2:
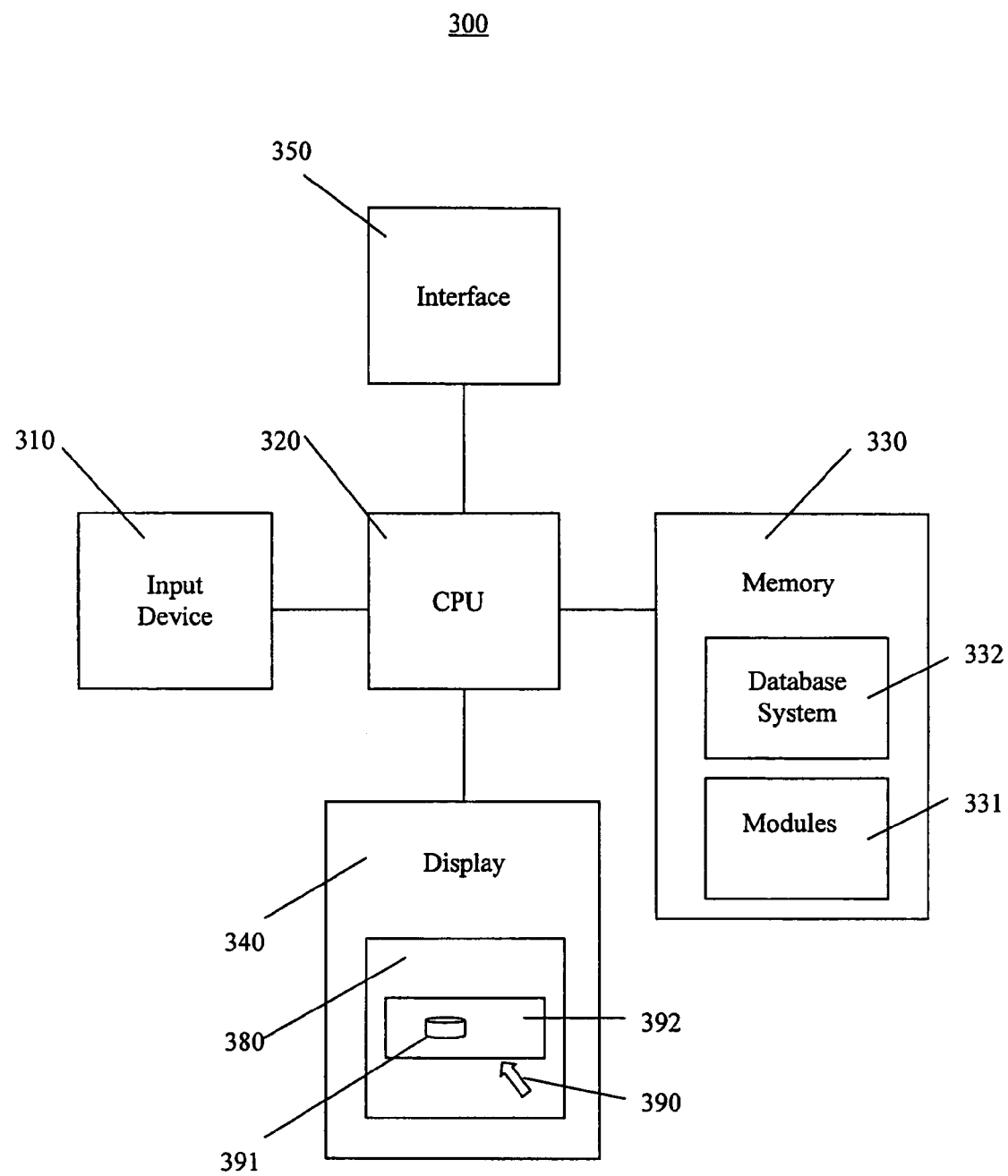
FIG. 2 is a block diagram illustrating a data processing system adapted to implement an embodiment of the invention; and, FIG. 3 is a flow chart illustrating operations of modules within the memory of a data processing system for establishing a pseudo-wire connection between first and second switches in a packet switched network, in accordance with an embodiment of the invention.

FIG. 2 is a block diagram illustrating a data processing system 300 adapted to implement an embodiment of the invention. The data processing system 300 is suitable for operation as a MPLS switch 110, 120, a CE device 150, 160, or a NMS. The data processing system 300 includes a central processing unit ("CPU") 320, memory 330, and an interface device 350 and may optionally include an input device 310 and a display 340. The CPU 320 may include dedicated coprocessors and memory devices. The memory 330 may include RAM, ROM, disk devices, and databases. The interface device 350 may include a network connection. The input device 310 may include a keyboard, a mouse, a trackball, or a similar device. And, the display 340 may include a computer screen, terminal device, or a hardcopy producing output device such as a printer or plotter. The data processing system 300 is adapted for communicating with other data processing systems (e.g., 110 or 120) over a network 130 via the interface device 350. The data processing system 300 may include a database system 332 for storing and accessing network topology and programming information. The database system 332 may include a database management system ("DBMS") and a database and may be stored in the memory 330 of the data processing system 300. The data processing system 300 has stored therein data representing sequences of instructions which when executed cause the method described herein to be performed. Of course, the data processing system 300 may contain additional software and hardware a description of which is not necessary for understanding the invention.

The data processing system 300 may be a MPLS switch 110, 120, a CE device 150, 160, a NMS, a server system, or a personal computer ("PC") system. The CPU 320 of the system 300 is operatively coupled to memory 330 which stores an operating system (not shown) for general management of the system 300. The interface 350 may be used for communicating to external data processing systems (e.g., 110 or 120) through a network 130. The system 300 may include application server software (not shown) for developing and managing distributed applications. The CPU 320 of the system 300 is typically coupled to one or more devices 310 for receiving user commands or queries and for displaying the results of these commands or queries to the user on a display 340. As mentioned, the memory 330 may include a variety of storage devices including internal memory and external mass storage typically arranged in a hierarchy of storage as understood to those skilled in the art.

A user may interact with the data processing system 300 and its hardware and software modules 331 using an optional graphical user interface ("GUI") 380. The GUI 380 may be used for monitoring, managing, and accessing the data processing system 300. GUIs are supported by common operating systems and provide a display format which enables a user to choose commands, execute application programs, manage computer files, and perform other functions by selecting pictorial representations known as icons, or items from a menu through use of an input or pointing device such as a mouse 310. In general, a GUI is used to convey information to and receive commands from users and generally includes a variety of GUI objects or controls, including icons, toolbars, drop-down menus, text, dialog boxes, buttons, and the like. A user typically interacts with a GUI 380 presented on a display 340 by using an input or pointing device (e.g., a mouse) 310 to position a pointer or cursor 390 over an object 391 and by "clicking" on the object 391.

Typically, a GUI based system presents application, system status, and other information to the user in "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

Thus, the data processing system 300 includes computer executable programmed instructions for directing the system 300 to implement the embodiments of the present invention. The programmed instructions may be embodied in one or more hardware modules 331 resident in the memory 330 of the data processing system 300.

As mentioned above, the MPLS LDP-DU signalling protocol with PW extensions is used to establish a bidirectional PW (e.g., 140) across a MPLS network (e.g., 130). For a PW 140 requiring resources, reservations are made independently in each direction (i.e., from 110 to 120 and from 120 to 110). This is accomplished by an exchange of signalling messages between the MPLS switches 110, 120 that are the endpoints of the PW 140, which triggers the resource reservation. However, this signalling exchange may give rise to the situation where one MPLS switch (e.g., 110) is able to reserve resources for a PW 140 while the other MPLS switch (e.g., 120) may fail to reserve resources. In this case, the signalling behaviour is such that the successfully reserved resources are held (i.e., by switch 110) until the failed PW connection (i.e., from 120 to 110) can be established, which may never occur. This can be problematic in that a PW 140 that is unable to be established due to a failure to acquire resources in one direction (i.e., from 120 to 110), may maintain a lock on resources at the opposite end (i.e., within switch 110). This is inefficient in that if the locked resources were available, they may have been able to have been used to allow a different PW (not shown) to be successfully established bi-directionally. Efficient allocation of such resources becomes most important upon re-establishing links after a network or network element failure.

Now, the present invention provides an optimization of the signalling behaviour in the establishment of MPLS pseudo-wires. According to one embodiment of the invention, a MPLS switch (e.g., 120) makes use of the bi-directional nature of PWs to force resources for a PW 140 to be freed at a far end MPLS switch (e.g., 110) when it cannot reserve resources locally (i.e., at 120). When the MPLS switch 120 detects that it cannot establish a PW 140 upon receipt of a connection message (e.g., a LDP label mapping message as described in Section 3.5.7 of RFC 3036) from a far end MPLS switch 110 due to a resource reservation failure for example, the local MPLS switch 120 triggers the far end MPLS switch 110 to release resources for the failed PW 140 in the reverse direction (i.e., from 120 to 110) using a LDP-DU signalling message. This message maybe a single LDP-DU message indicating a withdrawal of the PW LDP label mapping message (e.g., a LDP label withdraw message as described in Section 3.5.10 of RFC 3036). The MPLS switch 120 (or 110) may periodically attempt to establish the PW 140 so that the PW 140 can be successfully established if and when resources become available.

The resources for establishing and maintaining a PW 140 at each MPLS switch 110, 120 may include memory 330, CPU 320 capacity, and interface 350 capacity. In particular, to establish a PW connection 140, a switch (e.g., 110, 120) has to allocate the following:

(1) Required memory and context. These resources are implementation dependent, of course. Examples include RAM, non-volatile storage, etc.;

(2) Connection admission control ("CAC") resources. These resources ensure that all network devices have enough capacity to satisfy the quality of service ("QoS") requirements of the connection. This is often referred to bandwidth reservation; and, (3) The allocated pseudo-wire label that is advertised to the PE router; pseudo-wire label binding context (such as entries in a label information base) for both received and allocated labels; and, pseudo-wire connection state maintenance.

The present invention provides several advantages. First, the increase in the number of signalling messages that are exchanged in the situation where a PW fails to be established is minimal, thus only minimally increasing the burden on MPLS switches. Second, the invention improves the recovery time due to network failures. In particular, the problem addressed by the present invention is most apparent in situations where a large number of PWs may need to be re-established as a result of a network failure. In this case, the probability is high that the PWs will compete for resources as they move from the failed network element(s) to other available network elements. In this case, the present invention allows the MPLS switches in a network to re-establish PWs for which there are enough resources at the expense of those whose resource requirements cannot be met. By doing so, the present invention enables a MPLS switch to increase the probability of successfully establishing a greater number of PWs or other connections such as LSPs, where there is contention for resources, thereby reducing customer outages and limiting the impact on service level agreements. Third, the present invention reduces the CPU and memory utilization of a MPLS switch by allowing the switch to maintain state only for successful PW connections.

Figure 3:
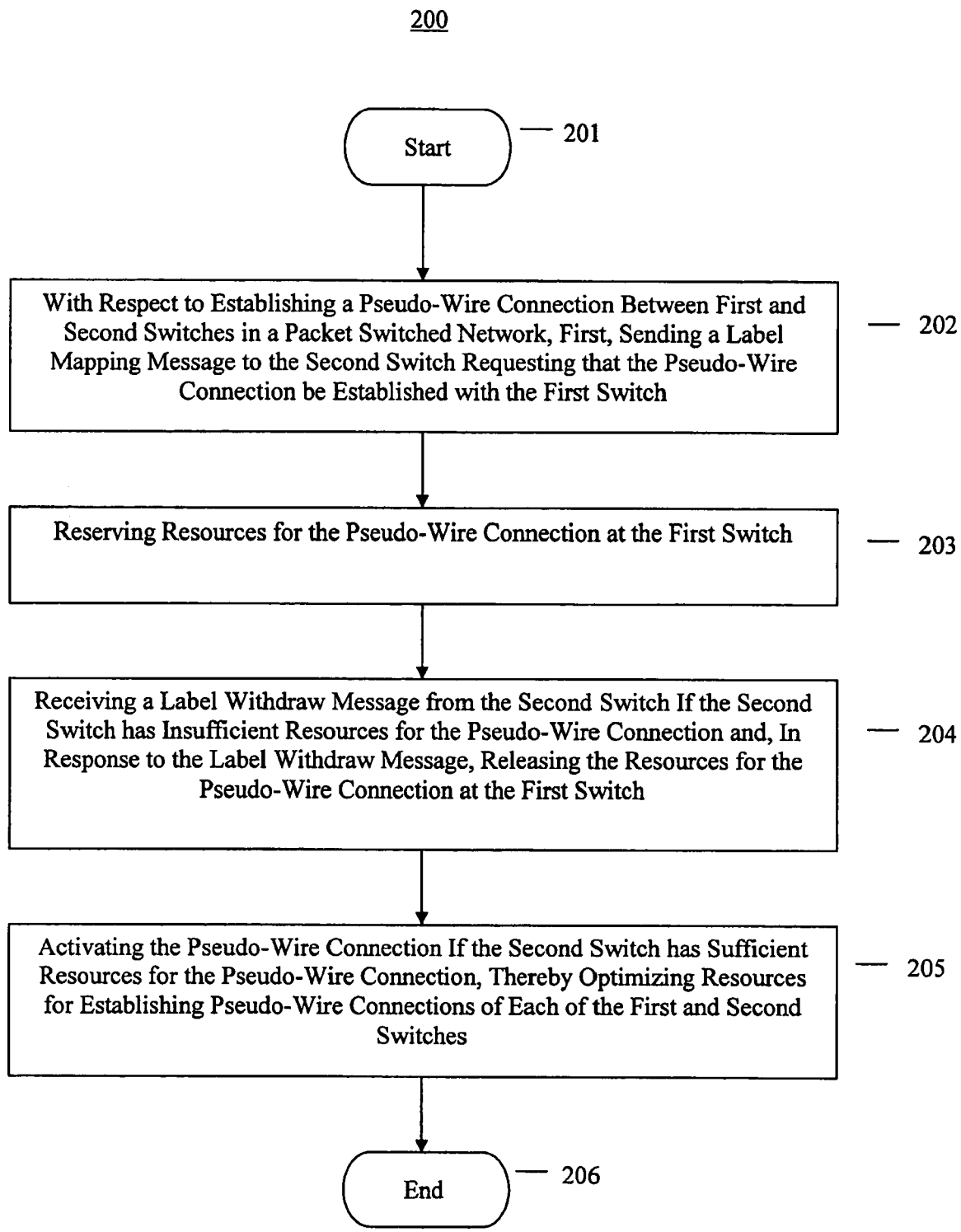

The above described method may be summarized with the aid of a flowchart. FIG. 3 is a flow chart illustrating operations 200 of modules 331 within the memory 330 of a data processing system 300 for establishing a pseudo-wire connection 140 between first and second switches 110, 120 in a packet switched network 130, in accordance with an embodiment of the invention.

At step 201, the operations 200 start.

At step 202, a label mapping message is sent to the second switch 120 requesting that the pseudo-wire connection 140 be established with the first switch 110.

At step 203, resources for the pseudo-wire connection 140 are reserved at the first switch 110.

At step 204, a label withdraw message is received from the second switch 120 if the second switch 120 has insufficient resources for the pseudo-wire connection 140 and, in response to the label withdraw message, the resources for the pseudo-wire connection 140 are released at the first switch 110.

At step 205, the pseudo-wire connection 140 is activated if the second switch 120 has sufficient resources for the pseudo-wire connection 140, thereby optimizing resources for establishing pseudo-wire connections (e.g., 140) of each of the first and second switches 110, 120.

At step 206, the operations 200 end.

In the above method, the network 130 may be a multiprotocol label switching ("MPLS") network. The first and second switches 110, 120 may be first and second MPLS switches, respectively. The pseudo-wire connection 140 may be a bi-directional pseudo-wire connection. The bi-directional pseudo-wire connection 140 may be one or more bi-directional pseudo-wire connections. The method may further include configuring the pseudo-wire connection 140 on each of the first and second switches 110, 120. And, the resources may be one or more of memory 330, processor 320 capacity, network interface 350 capacity, connection admission control resources, allocated pseudo-wire labels, pseudo-wire label binding context, and pseudo-wire connection state maintenance.

According to one embodiment of the invention, the above described method may be implemented by a NMS (not shown) rather than by, or in combination with, the MPLS switches 110, 120.

While this invention is primarily discussed as a method, a person of ordinary skill in the art will understand that the apparatus discussed above with reference to a data processing system 300, may be programmed to enable the practice of the method of the invention. Moreover, an article of manufacture for use with a data processing system 300, such as a pre-recorded storage device or other similar computer readable medium including program instructions recorded thereon, may direct the data processing system 300 to facilitate the practice of the method of the invention. It is understood that such apparatus and articles of manufacture also come within the scope of the invention.

In particular, the sequences of instructions which when executed cause the method described herein to be performed by the data processing system 300 of FIG. 2 can be contained in an integrated circuit product (e.g., hardware modules) including a coprocessor or memory according to one embodiment of the invention. This integrated circuit product can be installed in the data processing system 300 of FIG. 2.

The embodiments of the invention described above are intended to be exemplary only. Those skilled in this art will understand that various modifications of detail may be made to these embodiments, all of which come within the scope of the invention.

What is claimed is:

1. A method of establishing bidirectional pseudo-wire connections between first and second switches in a packet switched network, the method comprising:
    sending, with a Provider Edge (PE) device, a label mapping message to the second switch requesting that a pseudo-wire connection be established in a direction from the second switch to the first switch;
    reserving resources for the pseudo-wire connection at the first switch in a direction from the first switch to the second switch;
    receiving a label withdraw message from the second switch when the second switch has insufficient resources for the pseudo-wire connection in the direction from the second switch to the first switch;
    in response to the label withdraw message, releasing the resources for the pseudo-wire connection at the first switch in the direction from the first switch to the second switch; and
    activating the pseudo-wire connection when the second switch has sufficient resources for the pseudo-wire connection, thereby optimizing resources for establishing pseudo-wire connections of each of the first and second switches.

2. The method of claim 1, wherein the network is a multi-protocol label switching ("MPLS") network.

3. The method of claim 2, wherein the first and second switches are first and second MPLS switches, respectively.

4. The method of claim 3, wherein the resources are one or more of memory, processor capacity, network interface capacity, connection admission control resources, allocated pseudo-wire labels, pseudo-wire label binding context, and pseudo-wire connection state maintenance.

5. A system for establishing bidirectional pseudo-wire connections between first and second switches in a packet switched network, the system comprising:
    a processor coupled to memory and to an interface to the network; and
    hardware modules within the memory and executed by the processor, the hardware modules including:
        a module that sends a label mapping message to the second switch requesting that a pseudo-wire connection be established in a direction from the second switch to the first switch;
        a module that reserves resources for the pseudo-wire connection at the first switch in a direction from the first switch to the second switch;
        a module that receives a label withdraw message from the second switch when the second switch has insufficient resources for the pseudo-wire connection in the direction from the second switch to the first switch and, in response to the label withdraw message, releases the resources at the first switch in the direction from the first switch to the second switch; and,
        a module that activates the pseudo-wire connection when the second switch has sufficient resources to establish the pseudo-wire connection, thereby optimizing resources for establishing pseudo-wire connections of each of the first and second switches.

6. The system of claim 5, wherein the network is a multi-protocol label switching ("MPLS") network.

7. The system of claim 6, wherein the first and second switches are first and second MPLS switches, respectively.

8. The system of claim 7, wherein the resources are one or more of memory, processor capacity, network interface capacity, connection admission control resources, allocated pseudo-wire labels, pseudo-wire label binding context, and pseudo-wire connection state maintenance.

9. The system of claim 5, wherein the system is a network management system.

10. The system of claim 5, ASTM D4596-1a wherein the system is included in one or more of the first and second switches.

* * * * *